United States Patent

[11] 3,622,085

| [72] | Inventors | Claude Lucien Rivoire<br>Belo Horizonte Minas Gerais, Brazil;<br>Raymond Mourros, Le Teil, France |
|---|---|---|
| [21] | Appl. No. | 838,192 |
| [22] | Filed | July 1, 1969 |
| [45] | Patented | Nov. 23, 1971 |
| [73] | Assignee | Societe Anonyme Ciments Lafarge<br>Paris, France<br>by said Claude L. Rivoire |
| [32] | Priority | Oct. 28, 1968 |
| [33] | | France |
| [31] | | 171,666 |

[54] MANUFACTURE OF SUPERWHITE CEMENTS
3 Claims, 3 Drawing Figs.

[52] U.S. Cl. .................................................. 241/41,
241/67, 241/235
[51] Int. Cl. .................................................. B02c 4/44,
B02c 21/00, B02c 23/00
[50] Field of Search .......................................... 241/41, 60,
65–67, 101 R, 230, 235, DIG. 13

[56] References Cited
UNITED STATES PATENTS

| 511,292 | 12/1893 | Dorn | 241/67 |
|---|---|---|---|
| 1,740,940 | 12/1929 | Brasington | 241/67 |
| 2,650,034 | 8/1953 | Weimer | 241/67 |
| 3,003,757 | 10/1961 | Mitchell | 241/23 X |
| 3,406,624 | 10/1968 | Kutchera | 241/235 X |

FOREIGN PATENTS

| 1,293,669 | 4/1962 | France | 241/60 |

Primary Examiner—Donald G. Kelly
Attorney—Brumbaugh, Graves, Donohue & Raymond

ABSTRACT: Apparatus in which cement clinker is crushed at a temperature of 1,000° to 1,450° C., is then brought, while passing through a reducing atmosphere for between 1.5 and 6 minutes, down to a temperature in the range 700° to 1,100° C., is then subjected to rapid cooling by the application of atomized water to reduce the temperature to approximately 300° C. while excluding oxygen, and is finally collected in free air, thorough contact with the reducing atmosphere and the subsequent rapid cooling being ensured by carrying out these stages while the clinker is vibrated down an incline from the exit of the crusher to its point of collection in the atmosphere.

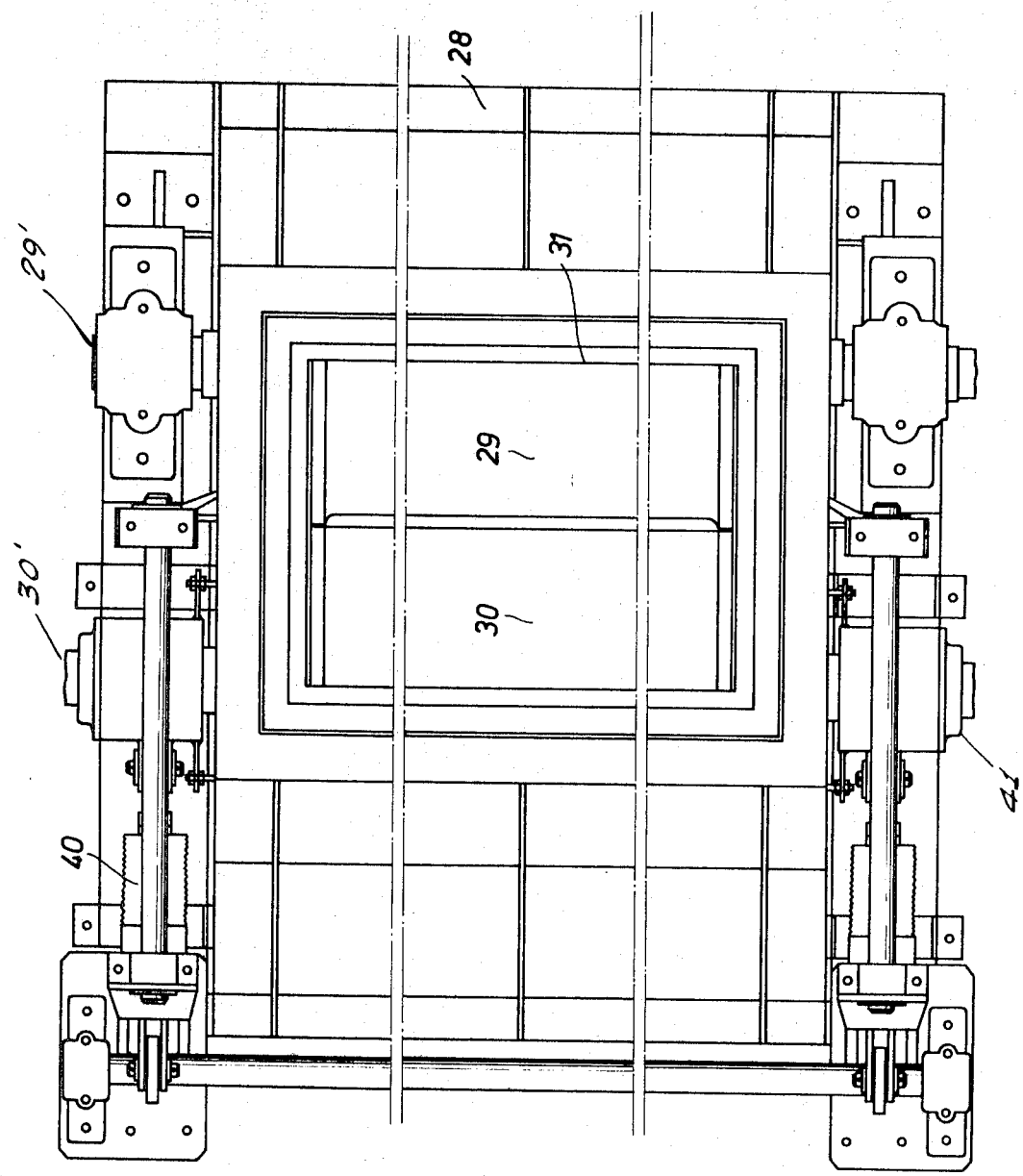

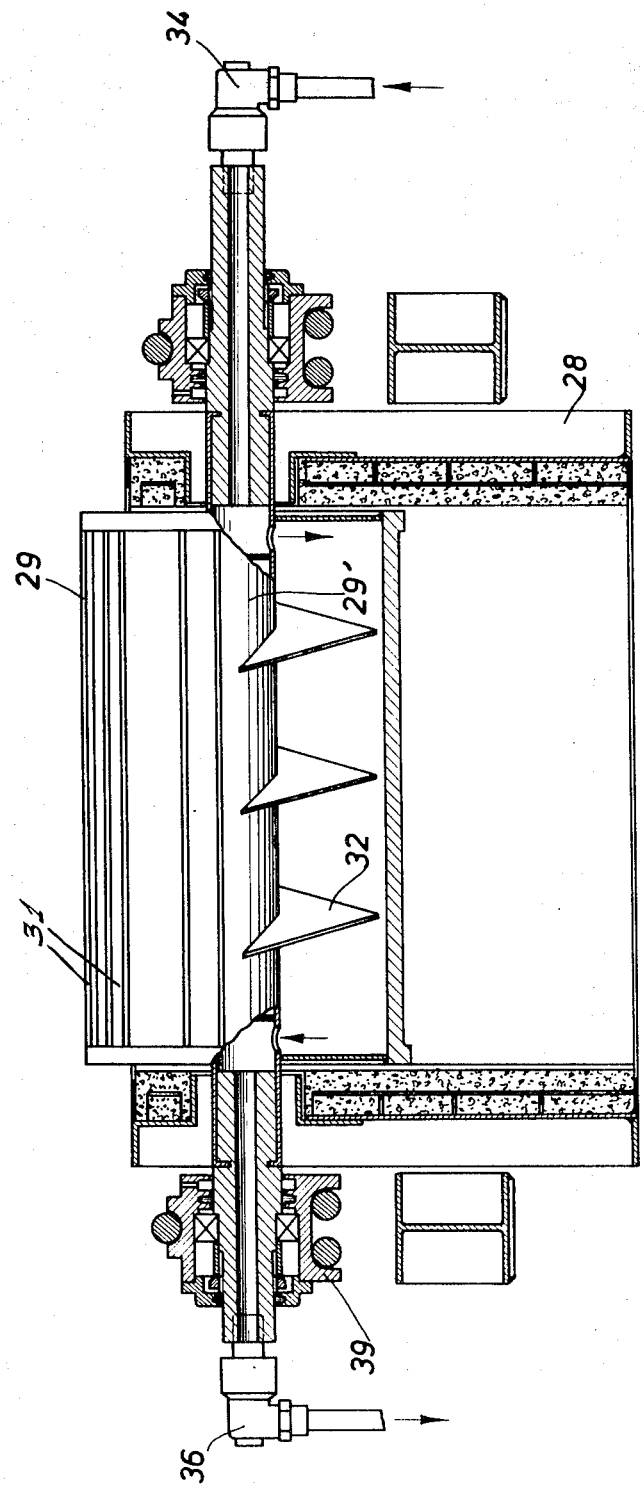

MANUFACTURE OF SUPERWHITE CEMENTS

The present invention relates to improvements in the manufacture of superwhite cements; it relates in addition to an apparatus for the carrying out of these improvements as well as to the improved superwhite cements thus obtained.

A process is already known, in particular through U.S. Pat. No. 3,425,853, for the manufacture of superwhite cement from a raw material finely crushed to pass approximately through a mesh of 15 mm. and containing about 15% $SiO_2$, 0.5% $Al_2O_3$, 45% of CaO, 1% MgO and less than 0.5% of $Fe_2O_3$, which material, after the addition of kaolin sand, is worked into a homogeneous paste and fired in a reducing atmosphere in such a way as to supply a very porous clinker, the analysis of which corresponds approximately to 25% $SiO_2$, less than 5% $Al_2O_3$, less than 0.5% iron, 68–75% CaO and 0–3% of MgO. In this known process, a fine and very porous clinker emerges from the furnace after firing at a temperature of 1,400° C. this clinker being crushed to a fine powder which is simultaneously subjected to intimate contact with a reducing gas such as propane, cooled over a period of about 10 minutes down to about 600° C., then collected as a very white cement. The whiteness of this cement is, on the index scale normally used for such measurements, as high as 90–93%. This whiteness index corresponds to brightnesses or luminances of 85 to 88 approximately, as defined by the International Lighting Committee (taking the value 100 for smoked magnesia) for a Blaine specific surface of 300 cm.$^2$/g.

In the above-mentioned specification, an arrangement is described in which, at the exit from the crusher, screw mixers are provided preferably several in number and with multiple screws lying above one another and provided with hollow blades through which water circulates. The circulation of the powder is advantageously in alternate directions in successive mixers. The reducing gas is introduced countercurrent to the direction of movement of the powder.

The results obtained with the process and apparatus mentioned above are very satisfactory. However, it has been found that the mixers often give rise to practical difficulties in operation and maintenance.

It is known also that, in the manufacture of superwhite cement, the hotter the clinker is maintained during processing, the better is its potential whiteness.

An object of the present invention is the production of superwhite cements of a brightness index at least equal to that of the cement obtained according to the process of the above-mentioned U.S. Patent, by carrying out the crushing, the passage through a reducing atmosphere, and the cooling stage under certain special conditions which make it possible to process clinker at a temperature appreciably higher than heretofore, and cooling down the clinker in a reducing atmosphere, in a vibrator unit with atomization of water. These particular conditions which form the basis of the present invention have furthermore turned out to overcome the practical difficulties mentioned above, and to supply improved superwhite cements.

Starting from a raw material and from a kaolin sand having more or less the analyses mentioned above, mixed into a paste and then fired in known manner to supply a clinker which is broken up in a reducing atmosphere and cooled down, the improvements according to the invention consist essentially in that the clinker is crushed at a temperature of 1,000° to 1,450° C., is then brought, while passing through a reducing atmosphere for between 1.5 and 6 minutes, down to a temperature in the range 700° to 1,100° C., is then subjected to rapid cooling by the application of atomized water to reduce the temperature to approximately 300° C. while excluding oxygen, and is finally collected in free air, thorough contact with the reducing atmosphere and the subsequent rapid cooling being ensured by carrying out these stages while the clinker is vibrated down an incline from the exit of the crusher to its point of collection in the atmosphere.

The duration of the passage of the clinker through the reducing atmosphere is preferable 4 to 5 minutes, but very favorable results are obtained in relation to the prior art with a duration of passage as short as some 2 minutes, this short period having the advantage of permitting the utilization of apparatus of appreciably smaller dimensions.

Apparatus for putting the above process into practice comprises essentially:

a crusher for the hot clinker, a vibrator frame and means for imparting vibration to said frame, mounted on the vibrator frame, a tank with an inclination of about 5° to 10° to the horizontal, in the tank, an upstream chamber and a downstream chamber, a bulkhead between the chambers and pivotally suspended at its upper edges, the bulkhead being adapted to provide a gastight division between the two chambers, means, such as burners, for maintaining a reducing atmosphere in the upstream chamber, sealed means for the introduction into this chamber of the hot crushed clinker, means for introducing atomized cooling fluid into the downstream chamber, a cooling system within the walls of the tank, a flue having an adjustable damper to regulate the pressure in the tank, and a number of inclined platforms arranged in staircase fashion relative to one another.

The crusher preferably comprises two cylinders with parallel axes, one cylinder having a substantially smooth surface and the other a toothed surface, means for driving each cylinder independently, and wherein the smooth cylinder is journaled in bearings sliding perpendicularly to its axis, and at least the toothed cylinder is able to rotate in either direction. Each cylinder has internal baffles, preferably helical, adapted to secure the circulation therethrough of a flow of cooling water. The crusher discharges into an outlet sealingly connected with the inlet of the upstream chamber of the vibrated tank.

There follows a detailed description of a preferred embodiment of apparatus according to the invention for the manufacture of superwhite cement.

In the accompanying drawings:

FIG. 2 is a plan view of a preferred embodiment of a crusher; and

FIG. 3 is a cross-sectional view of the sliding cylinder of the crusher.

Figure 1:
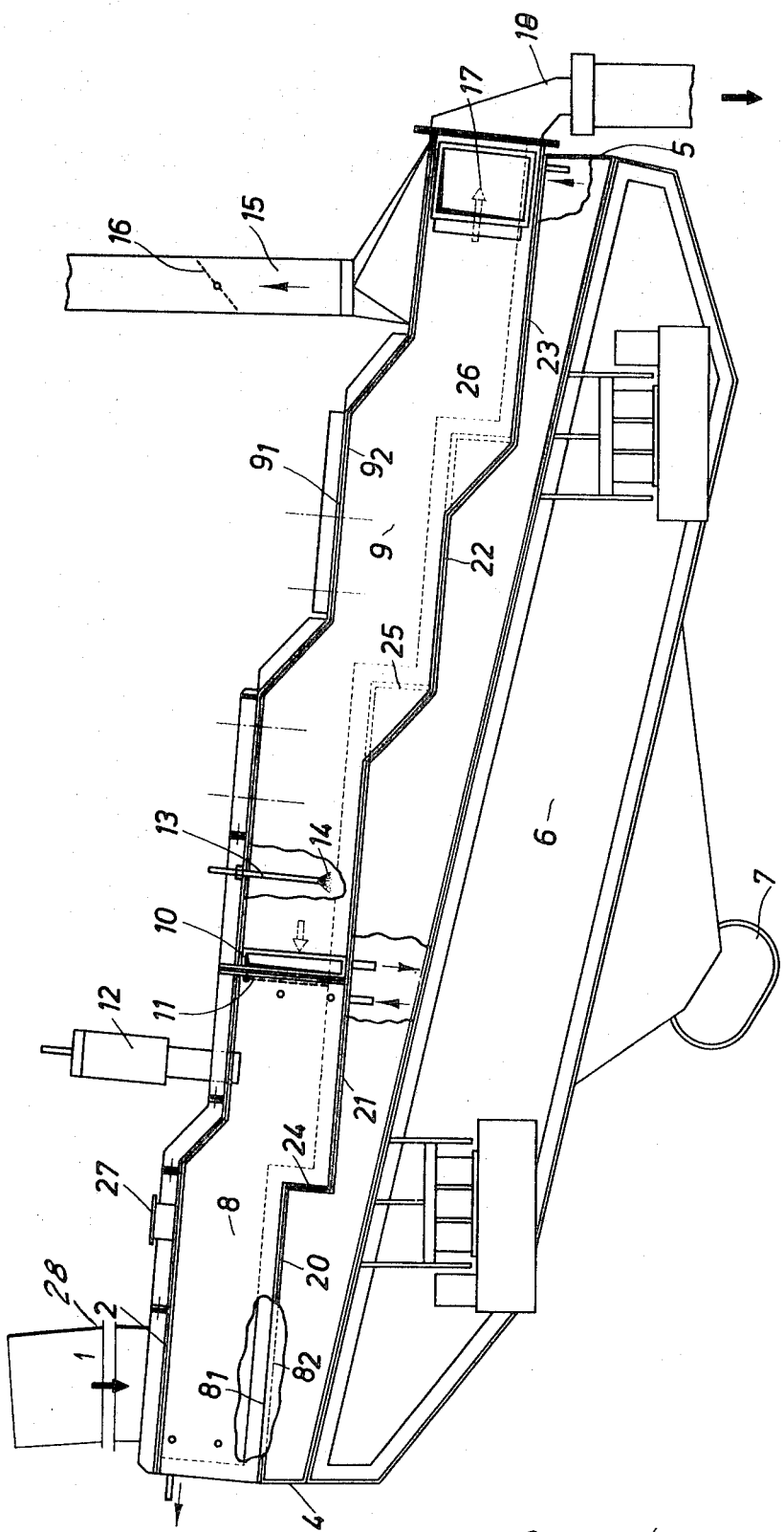
FIG. 1 is a longitudinal cross-sectional view of a vibrator unit.

In the embodiment shown, and referring first to FIG. 1, clinker which has been fired and then crushed to a fine powder falls from the crusher into a vibrating tank 1 through the tightly sealed inlet 2. The tank 1 is carried, by means of supports 4 upstream and 5 downstream, from a frame or chassis 6 directly excited by a vibrator device 7 of any known type.

The tank 1 comprises a double-walled upstream chamber 8 which forms a bleaching apparatus, and a downstream double-walled chamber 9, cooling water circulating between the walls $8_1$, $8_2$ of the chamber 8, and cooling air or water circulating between walls $9_1$, $9_2$ of the downstream chamber 9. The amounts of water and air employed are calculated in such a way as to provide a desired degree of cooling in the respective chambers (see below).

Between the chambers 8 and 9 there is mounted a bulkhead 10, movable about an axis 11 parallel with its upper horizontal edge. This bulkhead is arranged so that it touches the clinker bed only on rare occasions, otherwise it would be very quickly damaged. Thus the distance between the bottom of the bulkhead and the bed of clinker on the bottom of the tank is of the order of 5 to 10 cm. The bulkhead consists of three shutter sections arranged side by side and pivoted on the axis 11 at the top ends. Each shutter section thus effects the occlusion of one-third of the width of the tank. Burners 12 supplied with suitable fuel are situated in the upstream chamber 8 so as to enable maintenance therein of the required reducing atmosphere.

The downstream chamber 9 is provided with at least one bank 13 of water-atomizing nozzles 14, a flue 15 for the escape of steam with adjustment damper 16 and finally an exit orifice 17 for the treated product. This exit orifice discharges (in the arrangement shown) into a fixed channel or chute 18 which conducts the product to a conveyor. The exit orifice 17, being subject to vibration, discharges freely into the channel 18.

The double-walled base of the chambers 8 and 9 lies on a number (four as shown) of cross braces 20, 21, 22, 23 each arranged at an angle of 5° to 10° to the horizontal, and staggered in height so as to form steps 24, 25 and 26 perpendicular to and between the braces.

Finally, the upstream chamber 8 has a number (generally two) of safety valves 27 of any suitable known type, intended to protect the appliance in the event of malfunction and mounted between the inlet 2 and the burners.

In FIGS. 2 and 3 a preferred form of crusher is shown. This crusher comprises two hollow cylinders 29 and 30, with parallel horizontal axles 29' and 30', mounted in a frame 28. The cylinder 29 is provided with teeth 31 on its outer surface while the cylinder 30 has a substantially smooth outer surface. The inside of each cylinder 29, 30 is provided with a helical wall (e.g., wall 32 of cylinder 29, FIG. 3) extending between the axle and the inner wall, throughout the length of the cylinder, and a flow of water enters through rotary unions (e.g., union 34 of cylinder 29, FIG. 3) into the interior of each cylinder and leaves through rotary unions (e.g., union 36, FIG. 3).

The cylinders 29 and 30 are driven in opposite directions by two motors (not shown), pulleys (e.g., pulley 39 for roll 29, FIG. 3) and reduction gearboxes 40, of any suitable type.

The smooth cylinder 30 is journaled in sliding bearings 41, so as to be able to retract upon any hard bodies, such as bricks, or chain links, entering the nip of the rolls during crushing.

The drive to the toothed cylinder 29 is arranged so that it can be reversed if required in order to facilitate the removal of adherent material should the need arise.

In implementing the process of the invention a raw material is selected from soft clayey limestone, chalk, marl, sea shells and the waste carbonate of lime from industrial processing, the clay materials most used being clay and schists. For the manufacture of superwhite cement the raw materials must be practically free from impurities such as iron oxide, manganese and titanium. A typical analysis of a suitable limestone is shown below.

$SiO_2$: 14 to 15%
$Al_2O_3$: 0.6%
$Fe_2O_3$: 0.2%
CaO: 46 to 47%
MgO: 1%
$CO_2$:(in carbonate form), 37%

In a typical example, this limestone was made into a paste by the addition of water and a clayey material (kaolin sand) having the following approximate composition:

$SiO_2$: 70 to 80%
$Al_2O_3$: 10 to 20%
$Fe_2O_3$: 0.5%
CaO: 1.5%

It is also possible to add pure alumina, hydrated or calcined.

The mixing of the limestone and clayey materials was in proportions such that, after firing, the clinker had a composition within the following limits (by weight)

$SiO_2$: 24 to 27%
$Al_2O_3$: <5%
$Fe_2O_3$: <0.4%
CaO: 69.5 to 72.5%
MgO: 0 to 3%

To prevent the contamination of the clinker by fuel ash, firing was by oil or fuel gases in a furnace according to known methods. The clinker formed at a temperature of 1,400°–1,550°, the exact temperature depending from the composition of the raw material. After passing through the hottest area of the furnace where it was transformed into a semimolten mass, the clinker continued to move towards the exit from the furnace, cooling down sufficiently for it to reassume the solid state. By limiting the $Al_2O_3$ content of the clinker to a maximum of 5 percent, it was possible to give to the clinker a high porosity as is desirable.

On leaving the furnace, the clinker, which was still at a temperature of about 1,400° C. was applied into a crusher such as that described with reference to FIGS. 2 and 3. During crushing the clinker cooled down slightly, so that it entered the vibrator unit described with reference to FIG. 1 at a temperature of 1,100° to 1,400° C.; this high temperature improved the potential whiteness of the clinker.

The crushed clinker was admitted through the inlet 2 into the upstream chamber 8 of the tank 1. In this chamber 8 a reducing atmosphere was set up by maintaining a slightly superatmospheric pressure so as to prevent the entry of air to the chamber while air from burning by means of the burners 12 a combustible mixture containing an excess of hydrocarbon gases, for example $C_1$ to $C_4$ hydrocarbons, and especially propane. The fuel/air ratio was adjusted so that the combustion gases were practically free from unburnt hydrocarbons and condensable products of incomplete combustion (for example aldehydes). Typically, the atmosphere in the chamber 8 had a composition in the following range CO: 10 to 14%
$CO_2$: 5 to 9%
$O_2$: 0 to traces
$H_2$: 1 to 5%
S: <0.5% with a $CO/CO_2$ ratio of 1.5 to 2.

The vibrator device 7 was started a little before the arrival of the first clinker in chamber 8. The frequency of vibration transmitted to the tank 1 and thus to the chambers 8 and 9 was 800 to 1,100 per minute, with an amplitude of 1 to 2 mm. approximately. This resulted in the clinker having a residence time of approximately 1 to 2 minutes in the chamber 8, while its intimate contact with the reducing atmosphere was promoted. The clinker passed from step to step on the inclined cross braces of the double-walled bottom of the tank and distributed itself into a bed having an even thickness of 3 to 8 cm. while advancing towards the exit orifice 17, which was reached after a period of from 3 to 5 minutes as a result of the vibrations. In the downstream chamber 9, the nozzles 14 generously watered the clinker which retained however only less than 0.5 percent of the cooling water thus sprayed. The steam developed escaped through the flue 15 whose damper enabled the pressure in chamber 9 to be regulated in such a way as to prevent the admission of air into the chamber. The superatmospheric pressure inside the chambers 8 and 9 was of the order of 1 to 2 mm.

The clinker reached the exit orifice 17 at a temperature of approximately 300° C., this cooling being assisted by the circulation of water or air between the double walls of the chambers 8 and 9, this temperature being low enough for it to be possible to expose the clinker to the ambient air without detriment.

A clinker was collected at the lower end of the channel 18 having the following composition:

$SiO_2$: 24.6
$Al_2O_3$: 2.6
$Fe_2O_3$: 0.3
CaO: 71.2
MgO: 0.9
$TiO_2$: 0.04
$Mn_2O_3$: 0.006
$Cr_2O_3$: 0.001

The clinker had a brightness or luminance (defined by the International Lighting Committee, taking the value 100 for smoked magnesia) of 87/90 for a Blaine specific surface of 3,000 cm.$^2$/g.

Similar results were obtained with all clinkers produced under the conditions described from the raw materials with approximately the analysis mentioned.

It will be noted immediately that the invention enables very appreciable improvements in the whiteness of superwhite cements, to an extent of about two points on the scale referred to above.

What we claim is:

1. Apparatus for the production of superwhite cement from hot fired clinker comprising:

a crusher for the hot clinker, a vibrator frame and means to impart vibration to said frame, a tank mounted on said frame with an inclination of about 5°–10 to the horizontal, said tank being divided into an upstream and a downstream chamber by a bulkhead pivotally suspended from the tank by its top edge, and having a bottom wall formed as a number of platforms arranged as a staircase extending downwards from the upstream end to the downstream end of the tank, in the upstream chamber, means for maintaining a reducing atmosphere in said chamber, airtight means connecting said upstream chamber to said crusher, in the downstream chamber, means for admitting atomized evaporable cooling liquid, a cooling system in the walls of the tanks, and a flue, provided with an adjustable damper, connected to the downstream chamber.

2. Apparatus according to claim 1, wherein the crusher comprises two cylinders mounted on parallel axles in a framework, one cylinder having a substantially smooth surface and the other cylinder a toothed surface, the smooth cylinder being mounted in bearings slidable in the framework in a direction perpendicular to its axis, independent drive means associated with each cylinder, at least that associated with the toothed roller being reversible, internal baffles within each roller adapted to direct a current of cooling water therethrough, and an outlet chute connected in airtight manner to the tank.

3. Apparatus according to claim 2 wherein the baffles are helical.

* * * * *

UNITED STATES PATENT OFFICE
CERTIFICATE OF CORRECTION

Patent No. 3,622,085  Dated November 23, 1971

Inventor(s) Claude Lucien Rivoire et al

It is certified that error appears in the above-identified patent and that said Letters Patent are hereby corrected as shown below:

On the cover sheet [73] cancel "by said Claude L. Rivoire".
Column 1, line 75, "preferable" should read -- preferably --.
Column 5, line 12, "5°-10" should read -- 5-10° --.

Signed and sealed this 25th day of July 1972.

(SEAL)
Attest:

EDWARD M. FLETCHER, JR.  ROBERT GOTTSCHALK
Attesting Officer  Commissioner of Patents